United States Patent [19]
Akamatsu

[11] Patent Number: 6,032,526
[45] Date of Patent: Mar. 7, 2000

[54] HEATING RESISTOR TYPE AIR FLOW-METER OF RATIO-METRIC OUTPUT TYPE AND ENGINE CONTROL SYSTEM USING SAID HEATING RESISTOR TYPE AIR FLOW-METER

[75] Inventor: Masuo Akamatsu, Hitachinaka, Japan

[73] Assignee: Hitachi, Ltd., Japan

[21] Appl. No.: 08/974,393

[22] Filed: Nov. 19, 1997

[30] Foreign Application Priority Data

Nov. 19, 1996 [JP] Japan .................................. 8-307964

[51] Int. Cl.[7] .................................................. G01F 1/68
[52] U.S. Cl. .................. 73/204.17; 73/118.2; 73/204.15
[58] Field of Search ........................... 73/204.15, 204.17, 73/204.23, 204.25, 118.2

[56] References Cited

U.S. PATENT DOCUMENTS 5,201,217  4/1993  Wachi ...................................... 73/118.2
5,537,871  7/1996  Itsuji et al. ............................. 73/204.15

FOREIGN PATENT DOCUMENTS 2-85724  3/1990  Japan .

*Primary Examiner*—Harshad Patel
*Attorney, Agent, or Firm*—Evenson, McKeown, Edwards & Lenahan, P.L.L.C.

[57] ABSTRACT

A heating resistor type air flow-meter has a ratio-meter circuit comprising a proportional circuit for outputting a signal $V_{out}$ proportional to an input voltage $V_{in}$ a multiplying circuit for outputting a multiplied signal $V_m$ proportional to a product of a voltage difference VD between an internal reference voltage VINT and an external reference voltage VREF and the voltage signal $V_{in}$ and an adding circuit for adding the output signal $V_p$ of the proportional circuit and the output signal $V_m$ of the multiplying circuit.

6 Claims, 4 Drawing Sheets

HEATING RESISTOR TYPE AIR FLOW-METER OF RATIO-METRIC OUTPUT TYPE AND ENGINE CONTROL SYSTEM USING SAID HEATING RESISTOR TYPE AIR FLOW-METER

BACKGROUND OF THE INVENTION

The present invention relates to a heating resistor type air flow-meter and an engine control system using said heating resistor type air flow-meter, and more particularly relates to a heating resistor type air flow-meter of ratio-metric output type and the engine control system using said heating resistor type air flow-meter.

An output signal from a heating resistor type air flow-meter is transmitted to an engine control unit (hereinafter referred to as "ECU") and converted to a digital signal by an AD converter (hereinafter referred to as "ADC") in the ECU, and then an air flow rate is calculated. If voltage of an electric power source of the ADC at that time, an error is caused in the digital signal after converted. There is a method of reducing the error where a reference voltage in the ECU is input to the heating resistor air flow-meter as an external reference voltage, and the air flow rate signal is proportionally adjusted corresponding to the external reference voltage using a ratio-metric circuit inside the flow meter. The technology is disclosed, for example, in Japanese Patent Application Laid-Open No. 2-85724 (1990).

However, in the above conventional technology, the ratio-metric function is simply added to the heating resistor air flow-meter, and improvement of accuracy in the ratio-metric function is not considered.

SUMMARY OF THE INVENTION

An object of the present invention is to improve an accuracy of ratio-metric function and to provide a highly accurate heating resistor type air flow-meter of ratio-metric output type and a highly accurate heating resistor type air flow-meter.

Another object of the present invention is to provide a highly accurate engine control apparatus.

The above object can be attained by providing a heating resistor type air flow-meter of ratio-metric output type, wherein a ratio-metric circuit for outputting an output signal $V_{out}$ expressing an air flow rate by processing a voltage signal $V_{in}$ detected from a current heating a heating resistor using a second reference voltage signal input from an external means, the ratio-metric circuit comprising an internal reference electric power source circuit for generating a first reference signal; a proportional circuit for receiving the voltage signal $V_{in}$ and outputting a proportional signal $V_p$ proportional to the voltage signal $V_{in}$; a multiplying circuit for outputting a multiplied signal $V_m$ proportional to a product of "a difference signal between the first reference voltage signal and the second reference voltage signal" and "the voltage signal $V_{in}$"; and an adding circuit for producing the output signal $V_{out}$ by adding the proportional signal $V_p$ and the multiplied signal $V_m$.

Further, the above object can be attained by providing a heating resistor type air flow-meter comprising a detecting circuit for outputting a signal $V_{in}$ detected from a current heating a heating resistor provided in an air flow passage; an air temperature detecting means for detecting a temperature signal of air to be measured flowing in the air flow passage; an adding-subtracting means for outputting a correction signal by adding or subtracting a voltage signal proportional to the temperature signal to or from a second reference voltage signal input from an external means; and a ratio-metric circuit having an internal reference electric power source circuit for generating a first reference signal, a proportional circuit for receiving the signal $V_{in}$ and outputting a proportional signal $V_p$ proportional to the signal $V_{in}$, a multiplying circuit for outputting a multiplied signal $V_m$ proportional to a product of "a difference signal between the first reference voltage signal and the second reference voltage signal" and "the signal $V_{in}$", and an adding circuit for outputting an output signal $V_{out}$ expressing an air flow rate produced by adding the proportional signal $V_p$ and the multiplied signal $V_m$.

Furthermore, the above object can be attained by providing an engine control apparatus comprising a heating resistor type air flow-meter for outputting a signal $V_{in}$ detected from a current heating a heating resistor; an internal reference electric power source circuit for generating a first reference voltage signal; an engine control unit having a reference electric power source circuit for generating a second reference signal, a proportional circuit for outputting a signal $V_p$ proportional to the signal $V_{in}$, a multiplying circuit for outputting a signal $V_m$ proportional to a product of "a difference between the first reference voltage signal and the second reference voltage signal" and "the signal $V_{in}$", and an adding circuit for adding the signal $V_p$ and the signal $V_{in}$, the added signal being processed to obtain an output signal $V_{out}$ expressing an air flow rate.

According to the present invention, since the ratio-metric output signal is a signal formed by adding the output signal of the proportional circuit and the output signal of the multiplying circuit, an error of the ratio-metric circuit can be suppressed less than one-tenth when change in the external reference voltage is, for example, ±5% to the median value, and therefore the accuracy of the ratio-metric function can be improved.

Further, since the measurement accuracy of the heating resistor type air flow-meter is improved, it is possible to provide a highly accurate engine control apparatus.

DETAILED DESCRIPTION OF THE PREFERRED EMBODIMENTS

Embodiments of the present invention will be described below, referring to the accompanying drawings.

Initially, an embodiment of a heating resistor type air flow-meter of ratio-metric output type in accordance with the present invention will be described.

Figure 1:
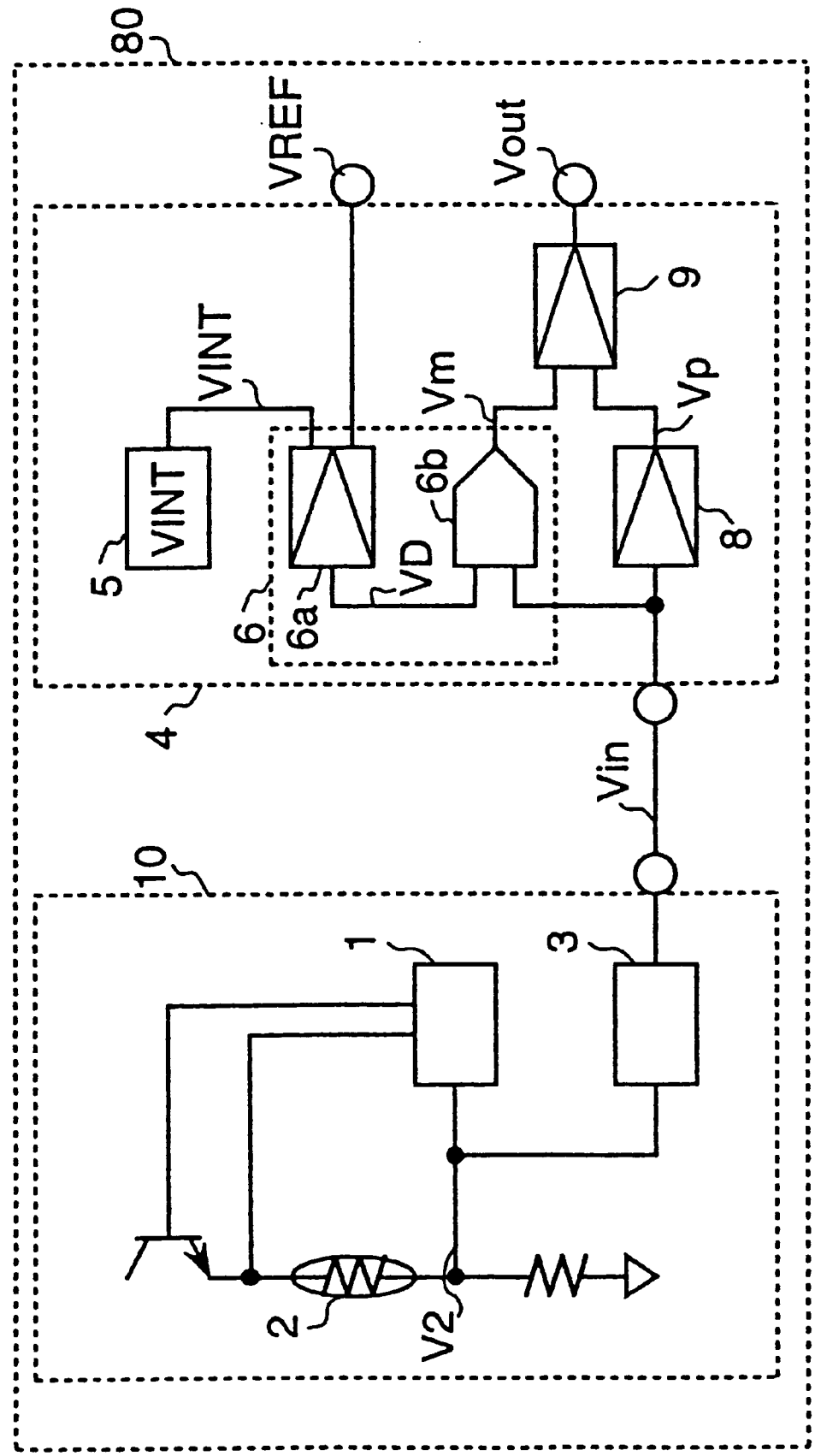
FIG. 1 is a diagram showing a first embodiment of a heating resistor type air flow-meter in accordance with the present invention.

FIG. 1 is a diagram showing a first embodiment of a heating resistor type air flow-meter in accordance with the present invention. In FIG. 1, a heating resistor type air flow-meter 80 (hereinafter, referred to as "air flow-meter 80") is composed of a detecting circuit 10 for detecting a voltage signal $V_{in}$ of an air flow rate signal input to a ratio-metric circuit, and the ratio-metric circuit 4 for outputting an output signal $V_{out}$ expressing an air flow rate by processing the voltage signal $V_{in}$ using a second reference voltage signal received from an external means.

That is, temperature of a heating resistor 2 placed in an air flow is controlled by a constant temperature control circuit 1 so as to maintain constant, and a heating current required to heat the heating resistor 2 of a heated wire is detected through a current detecting resistor to obtained a voltage signal V2. The detected signal V2 is adjusted by an output characteristic adjusting circuit 3, and the adjusted output of a voltage signal $V_{in}$ is processed to be converted into a ratio-metric output signal varied corresponding to the voltage signal $V_{in}$ in the ratio-metric circuit 4 using an external reference voltage VREF input from an external means to obtain an output signal $V_{out}$ of the ratio-metric circuit 4 (or, an air flow meter 80 to be described later).

In the embodiment of FIG. 1, the ratio-metric circuit 4 comprises an internal reference electric power source circuit 5 for generating an internal reference voltage VINT of a first reference voltage signal; a multiplying circuit 6 composed of a differential amplifier 6a for detecting a voltage VD of a difference between the external reference voltage VREF of a second reference voltage signal input from the external means, and the internal reference voltage VINT, and a multiplier 6b for outputting a voltage $V_m$ of a product of the voltage VD of the differential amplifier 6a and the output voltage $V_{in}$ of the output characteristic adjusting circuit 3; a proportional circuit 8 for outputting a voltage $V_p$ of a constant (K2) times of the output voltage $V_{in}$ of the output characteristic adjusting circuit 3; and an adding circuit 9 for adding the voltage $V_m$ of the multiplier 6b and the output voltage $V_p$ of the proportional circuit 8 to obtain the output voltage $V_{out}$ expressing an air flow rate of the flow meter.

The above-mentioned relationships are expressed by the following equations.

$$VD = K1*(VREF-VINT) \tag{Equation 1}$$

$$V_m = VD * V_{in} \tag{Equation 2}$$

$$= K1*(VREF-VINT)*V_{in} \tag{Equation 3}$$

$$V_p = K2 * V_{in} \tag{Equation 4}$$

$$V_{out} = V_m + V_p \tag{Equation 5}$$

$$= K1*(VREF-VINT)*V_{in} + K2*V_{in} \tag{Equation 6}$$

$$= \{K1*(VREF-VINT) + K2\}*V_{in} \tag{Equation 7}$$

Therein the value K2 among the constants K1 and K2 is set as follows.

$$K2 = K1 * VINT \tag{Equation 8}$$

Then the output voltage $V_{out}$ proportional to the external reference voltage VREF can be obtained as follows.

$$V_{out} = K1 * VREF * V_{in} \tag{Equation 9}$$

Letting an error ratio of the multiplying circuit 7 be $\epsilon_m$, then $$V_{out} = \epsilon_m * K1*(VREF-VINT)*V_{in} \tag{Equation 10}$$

and letting an error ratio of the output voltage $V_{out}$ be $\epsilon_v$, then $$\epsilon_v = d\,V_{out}/V_{out} = \epsilon_m * K1*(VREF-VINT)/VREF \tag{Equation 11}$$

Therefore, the error ratio $\epsilon_v$ of the ratio-metric circuit 4 to the error ratio $\epsilon_m$ of the multiplying circuit 6 can be reduced as follows.

$$\epsilon_v/\epsilon_m = (VREF-VINT)/VREF \tag{Equation 12}$$

In the above equation, assuming that the median value of the external reference voltage VREF is 5(V) and the variation range (variation rate range) is ±5%, VREF=4.75~5.25 (V). Therefore, the necessary condition to operate within the range of VREF>VINT is as follows, assuming VINT=5.75, $$\epsilon_v/\epsilon_m = 0 \sim 0.095 \tag{Equation 13}$$

and it can be understood that the error ratio $\epsilon_v$ of the ratio-metric circuit 4 is less than one-tenth of the error ratio $\epsilon_m$ of the multiplying circuit 6. That is, according to the present invention, the error ratio $\epsilon_v$ of the ratio-metric circuit 4 can be suppressed less than one-tenth of the error ratio of conventional one.

The ratio of the output voltage $V_p$ of the proportional circuit 8 to the output voltage $V_m$ of the multiplying circuit 6 is, from (Equation 6) and (Equation 9) as follows.

$$V_p/V_m = VINT/(VREF-VINT) \tag{Equation 14}$$

Therefore, when VREF=5 and VINT=4.75, the ratio becomes as follows.

$$V_p/V_m = 4.75/(5-4.75) = 19/1 \tag{Equation 15}$$

Further, when the variation range (variation rate range) is ±20% in taking an operation margin into consideration, V=4 V, and thus $$V_p/V_m = 4/(5-4) = 4/1 \tag{Equation 16}$$

and the reducing rate of the error ratio is as follows.

$$\epsilon_v/\epsilon_m = 0 \sim 0.238 \tag{Equation 17}$$

From the above, it can be understood that by setting the ratio $(V_p/V_m)$ of the output voltage $V_p$ of the proportional circuit 8 to the output voltage $V_m$ of the multiplying circuit 6 to a value larger than 4 (4 and 19 in the above cases), it is possible to obtain a practical ratio-metric circuit in which the operation margin is ensured and the error ratio $\epsilon_m$ of the multiplying circuit 7 is reduced. In other words, it can be said that the variation rate range of the second reference voltage signal (generally, the external reference voltage VREF) is necessary to be suppressed within 20 (%) of the median value of the variation rate range of the second reference voltage signal (that is, the external reference voltage VREF).

In a case of performing digital calculation to obtain a ratio-metric output, sufficient accuracy can be obtained only by multiplying calculation since there is no difference in calculation accuracy between multiplying and adding.

However, in order to perform digital calculation, it is required to employ functional elements inferior in temperature environment resistant characteristics (environment resistance) such as an AD converter, a microprocessor and the like, which causes a problem in that size of the ratio-metric circuit becomes large.

It can be considered that the ratio-metric circuit is constructed by an analogue multiplying circuit which is of a small circuit size, does not require any functional elements inferior in environment resistance, and is suitable in an environmental condition of vehicle air flow meter. However, it has been difficult to provide the analogue multiplying circuit with an accuracy equivalent to that of the analogue differential amplifying circuit. However, since an appropriate accuracy can be ensured by employing the idea of the present invention even when an analogue multiplying circuit is employed, it becomes possible to provide a heating resistor type air flow-meter having a highly accurate ratio-metric function by making use of an analogue multiplying circuit which is superior in environment resistance and simple in circuit construction.

Description will be made below on an embodiment of a ratio-metric circuit using the analogue multiplying circuit as a second embodiment of a ratio-metric circuit. The ratio-metric circuit typically shown in the first embodiment of the heating resistor type air flow-meter shown in FIG. 1 is a first embodiment of a ratio-metric circuit.

Figure 2:
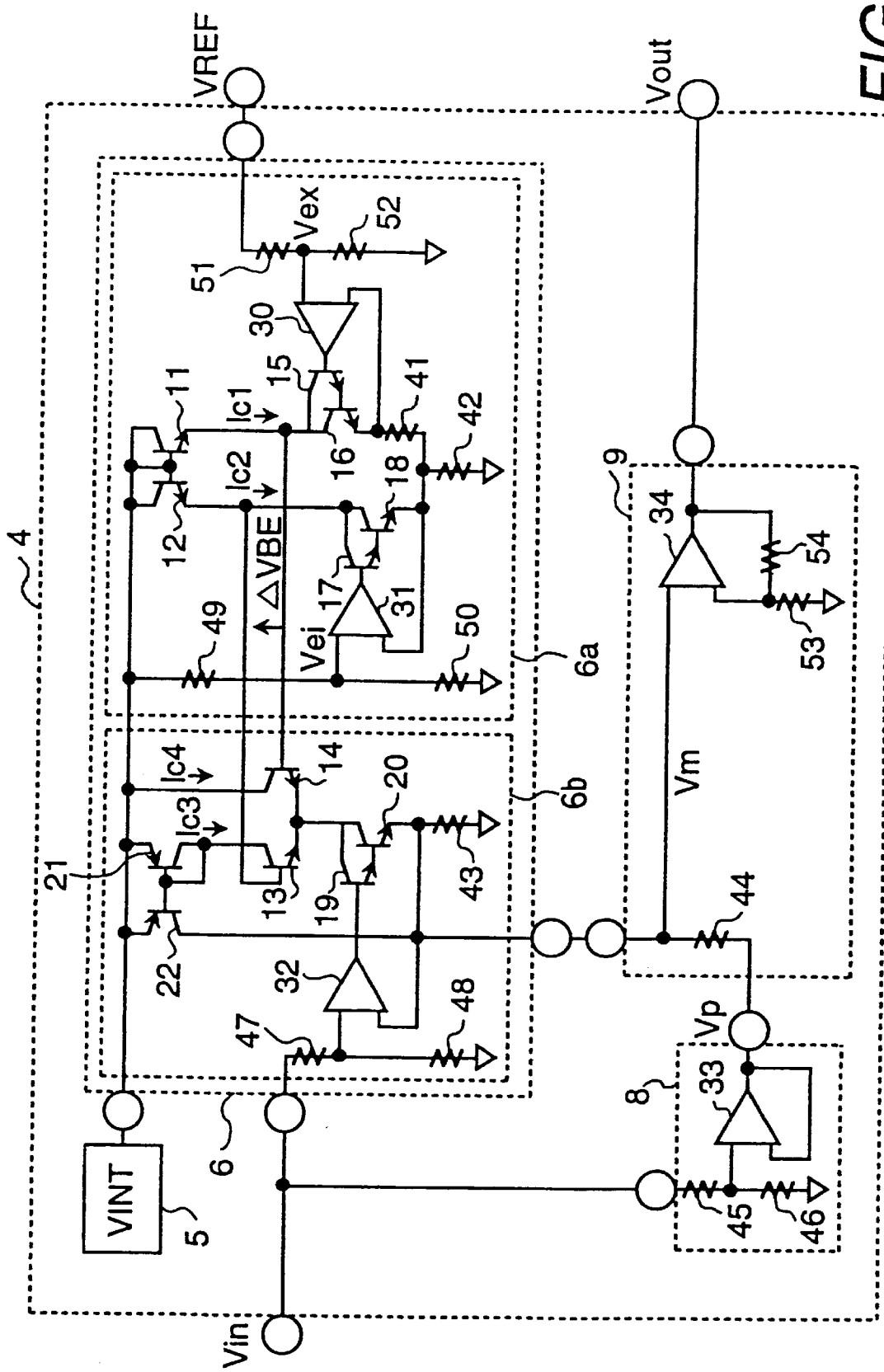
FIG. 2 is a diagram showing another embodiment of a ratio-metric circuit in accordance with the present invention.

FIG. 2 is a diagram showing another embodiment of a ratio-metric circuit in accordance with the present invention. The figure shows a detailed electronic circuit if the ratio-metric circuit.

The second embodiment of the ratio-metric circuit 4 comprises an internal reference electric power source circuit 5; a multiplying circuit 6 composed of a LOG amplifier 6c for outputting an output voltage ΔVBE proportional to a logarithm of the ratio of a difference between the external reference voltage VREF and the internal reference voltage VINT to the internal reference voltage VINT, and a differential amplifying circuit 6d for differential-amplifying the ΔVBE by giving a bias current proportional to the input voltage $V_{in}$; a proportional circuit 8; and an adding circuit 9. That is, currents of bipolar transistors 11, 12 are supplied to transistors 15, 16, 17, 18 controlled by operational amplifiers 30, 31, and by copying a difference ΔVBE of base-emitter voltages VBE between the transistors 11, 12 to emitter coupling differential type transistors 13, 14, a ratio of current of a resistor 43 controlled by an operational amplifier 32 to current of the transistor 13 is made equal to a ratio of voltage $V_{ex}$ to voltage $V_{ei}$ input to the operational amplifiers 30, 31. Letting the current of the transistors 11, 12 in that condition be $I_c1$, $I_c2$, respectively, the following relations can be obtained.

$$I_c1=(V_{ex}-V_{ei})/R1 \quad \text{(Equation 18)}$$

$$I_c1+I_c2=V_{ei}/R2 \quad \text{(Equation 19)}$$

$$I_c1/(I_c1+I_c2)=(V_{ex}-V_{ei})*R2/R1 \quad \text{(Equation 20)}$$

The base-emitter voltages VBE of the transistor can be expressed as follows.

$$VBE=(k*T/q)*log(I_c/I_s) \quad \text{(Equation 21)}$$

where k: Boltzmann constant, T: temperature [K], q: charge of electron, $I_c$: collector current of transistor, $I_s$: collector saturation current. Therefore, the difference ΔVBE of base-emitter voltages VBE between the transistors 11, 12 can be expressed as follows.

$$\Delta VBE=VBE1-VBE2 \quad \text{(Equation 22)}$$

$$=(k*T/q)*log(I_c1/I_c2) \quad \text{(Equation 23)}$$

Similarly, currents of the transistors 13, 14 can be expressed as follows.

$$\Delta VBE=VBE3-VBE4 \quad \text{(Equation 24)}$$

$$=(k*T/q)*log(I_c3/I_c4) \quad \text{(Equation 25)}$$

From (Equation 23) and (Equation 25), the following relations can be obtained.

$$I_c1/I_c2=I_c3/I_c4 \quad \text{(Equation 26)}$$

$$I_c3=(I_c3+I_c4)*I_c1*(I_c1+I_c2) \quad \text{(Equation 27)}$$

Current IEE flowing in the resistor 43 is as follows.

$$IEE=\{V_{in}*R48/(R47+R48)\}/R43 \quad \text{(Equation 28)}$$

$$=I_c3+I_c4 \quad \text{(Equation 29)}$$

From (Equation 18), (Equation 19), (Equation 27), (Equation 28) and (Equation 29), the following relation can be obtained.

$$I_c3=V_{in}*R48/\{(R47+R48)*R43\}*(V_{ex}/V_{ei}-1)*R42/R41 \quad \text{(Equation 30)}$$

Since a current mirror circuit formed by the transistors 21, 22 conduct current to a resistor 44 by reversing the polarity of the current $I_c3$ of the transistor 13, voltage $V_m$-$V_p$ of a resistor 44 becomes as follows.

$$V_m-V_p=R44*I_c3 \quad \text{(Equation 31)}$$

$$=R44*V_{in}*R48/\{(R47+R48)*R43\}*(V_{ex}/V_{ei}-1)*R42/R41 \quad \text{(Equation 32)}$$

Since the voltage $V_p$ is a divided voltage of $V_{in}$ by resistors 45, 46, the voltage $V_p$ can be expressed by the following equation.

$$V_p=V_{in}*R46/(R45+R46) \quad \text{(Equation 33)}$$

Thus, $$V_m=V_{in}*(R44/R43)*\{R48/(R47+R48)\}*(V_{ex}/V_{ei}-1)*R42/R41+V_{in}*R46/(R45+R46) \quad \text{(Equation 34)}$$

$$=V_{in}*[(R44/R43)*\{R48/(R47+R48)\}*(V_{ex}/V_{ei})*(R42/R41)+V_{in}*R46/(R45+R46)-(R44/R43)*\{R48/(R47+R48)\}*(R42/R41)] \quad \text{(Equation 35)}$$

Therefore, by setting values of the resistors as the following equation, the voltage $V_m$ becomes a ratio-metric output signal proportional to $V_{ex}$ and $V_{in}$.

$$R46/(R45+R46)=(44/R43)*\{R48/(R47+R48)\}*(R42/R41) \quad \text{(Equation 36)}$$

This voltage $V_m$ is input to the amplifying circuit composed of the operational amplifier 34 and the resistors 53, 54 to obtain an output signal $V_{out}$ of the flow-meter.

$$V_{out}=(1+R54/R53)* V_m \quad \text{(Equation 37)}$$

$$=V_{in}*(V_{ex}/V_{ei})*(1+R45/R53)*(R44/R43)*\{R48/(R47+R48)\}*(R42/R41) \quad \text{(Equation 38)}$$

Here, (Equation 20) can be rewritten as follows.

$$I_c2/I_c1=(R2/R1)* V_{ei}/(V_{ex}-V_{ei})-1 \quad \text{(Equation 39)}$$

Therefore, $$(R2/R1)=2*(V_{ex}/V_{ei}-1) \quad \text{(Equation 40)}$$

In that condition, currents of the transistors 11, 12 are equal to each other, and from (Equation 23) the output voltage ΔVBE of the LOG amplifier 6c becomes 0 V (zero Volt). Since the "current ratio of the differential transistor" becomes nearest to the theoretical value when the currents are equal to each other, the "current ratio of the differential transistor" is set so that the above equation is satisfied, that is, the output voltage ΔVBE of the LOG amplifier 6c becomes 0 V (zero Volt) when the external reference voltage VREF of the second reference voltage signal is at the median value of the variation range. By doing so, error in the ratio-metric transforming under a practical use condition can be further reduced.

$V_{ex}$ and $V_{ei}$ can be expressed by the following (Equation 41) and (Equation 42) from FIG. 2, and by substituting these equations into (Equation 38) the following (Equation 43) can be obtained.

$$V_{ex}=R52/(R51+R52)*VINT \quad \text{(Equation 41)}$$

$$V_{ei}=R50/(R49+R50)*VREF \quad \text{(Equation 42)}$$

$$V_{out}=V_{in}*(VREF/VINT)*\{R52/(R51+R52)\}*\{1+R50/R49\}*(1+R54/R53)*(R44/R43)*\{R48/(R47+R48)\}*(R42/R41) \quad \text{(Equation 43)}$$

The voltage VBE of the transistor is a function of temperature T, as described by (Equation 21). Therefore, when temperatures of respective transistors composing the LOG amplifier 6c and the differential amplifier 6d are different, the value of (Equation 21) is varied depending on the temperatures of the respective transistors. In order to stabilize the output $V_m$ of multiplying calculation by solving this problem, that is, to eliminate obstacles against heat dissipation, it is preferable that the multiplying circuit 6 is formed on a single silicon substrate to thermally couple well. In other words, it is preferable that the LOG amplifier 6c and the differential amplifier 6d are formed on a single silicon substrate, or the multiplying circuit 6 and adding circuit 8 are formed on a single silicon substrate.

Another embodiment of a heating resistor type air flow-meter of ratio-metric output type in accordance with the present invention will be described.

Figure 3:
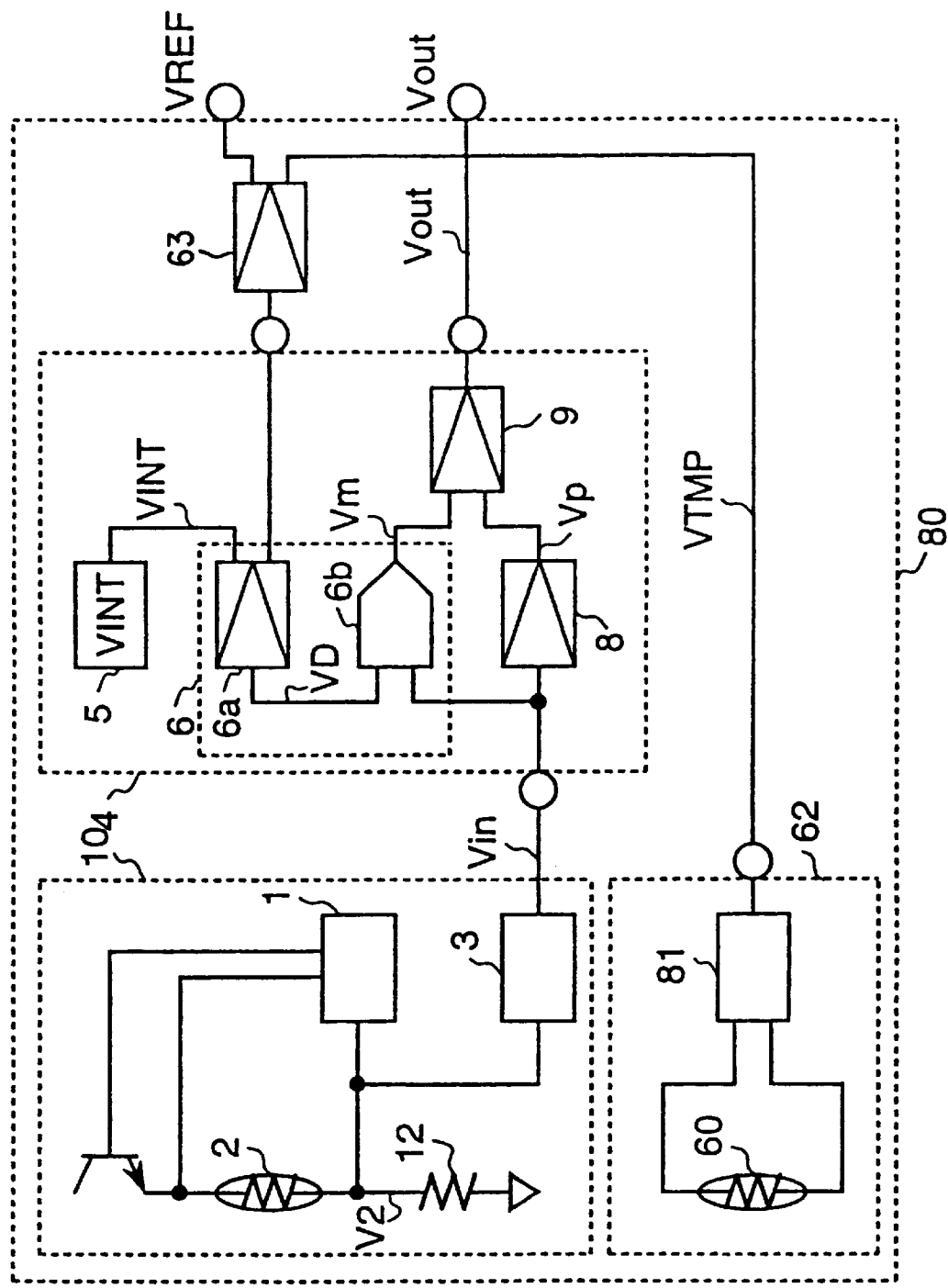
FIG. 3 is a diagram showing a second embodiment of a heating resistor type air flow-meter in accordance with the present invention.

FIG. 3 is a diagram showing a second embodiment of a heating resistor type air flow-meter in accordance with the present invention. The second embodiment of FIG. 3 is formed by adding an air temperature detecting means 62 and an adding-subtracting means 63 to the first embodiment of the air flow-meter shown in FIG. 1. That is, the heating resistor type air flow-meter comprises the air temperature detecting means 62 for detecting temperature of air to be measured, composed of an air temperature sensor 60 and an air temperature detecting circuit 61 and the adding-subtracting means 63 for processing (correcting) a temperature signal VTMP output from the air temperature detecting means 62, and the processed (corrected) signal is input to the ratio-metric circuit 4 as a second reference voltage signal.

In other words, the heating resistor type air flow-meter in accordance with the present invention comprises a heating resistor 2 provided in an air flow passage; a constant temperature control circuit 1 for supplying current so as to maintain temperature of the heating resistor 2 at a constant temperature; a detecting circuit 10 including a current detecting resistor 12 for detecting the controlled current supplied to the heating resistor and an output characteristic adjusting circuit 3 for outputting a voltage signal $V_{in}$; an air temperature detecting means 62 for detecting a temperature signal VTMP of air to be measured flowing in said air flow passage; an adding-subtracting means 63 for outputting a correction signal by adding or subtracting a voltage signal proportional to the detected voltage VTMP of the temperature signal to or from an external reference voltage VREF of a second reference voltage signal input from an external means (for example, an ECU) provided in the external; and a ratio-metric circuit including an internal reference electric power source circuit 5 for generating an internal reference voltage VINT of a first reference signal, a proportional circuit 8 for receiving the signal $V_{in}$ and outputting a proportional signal $V_p$ proportional to the signal $V_{in}$, a multiplying circuit 6 for outputting a multiplied signal $V_m$ proportional to a product of "a difference signal between the first reference voltage signal and the corrected signal" and "said signal $V_{in}$", and an adding circuit 9 for outputting an output signal $V_{out}$ expressing an air flow rate produced by adding the proportional signal $V_p$ and the multiplied signal $V_m$.

The second embodiment has an advantage in that the output characteristic of the flow-meter can be performed temperature correction in a case where the flow-rate characteristic of the flow-meter shows temperature dependence. There is no need to say that the same effect can be attained if the air temperature detecting means 62 is arranged outside the flow-meter and the temperature signal VTMP is input to the flow-meter, in the embodiment of FIG. 3.

In the first embodiment, "the second reference voltage signal of the ratio-metric circuit is equal to the external reference voltage VREF", but in the second embodiment, "the second reference voltage signal of the ratio-metric circuit is equal to the corrected signal of the external reference voltage VREF". In other words, the second reference voltage signal is a voltage signal for inputting the ratio-metric circuit and processing the input signal $V_{in}$, and the external reference voltage is a voltage signal to be used by an AD converter 71 of an ECU 70 to be described later.

A further embodiment of a heating resistor type air flow-meter of ratio-metric output type in accordance with the present invention will be described.

Figure 4:
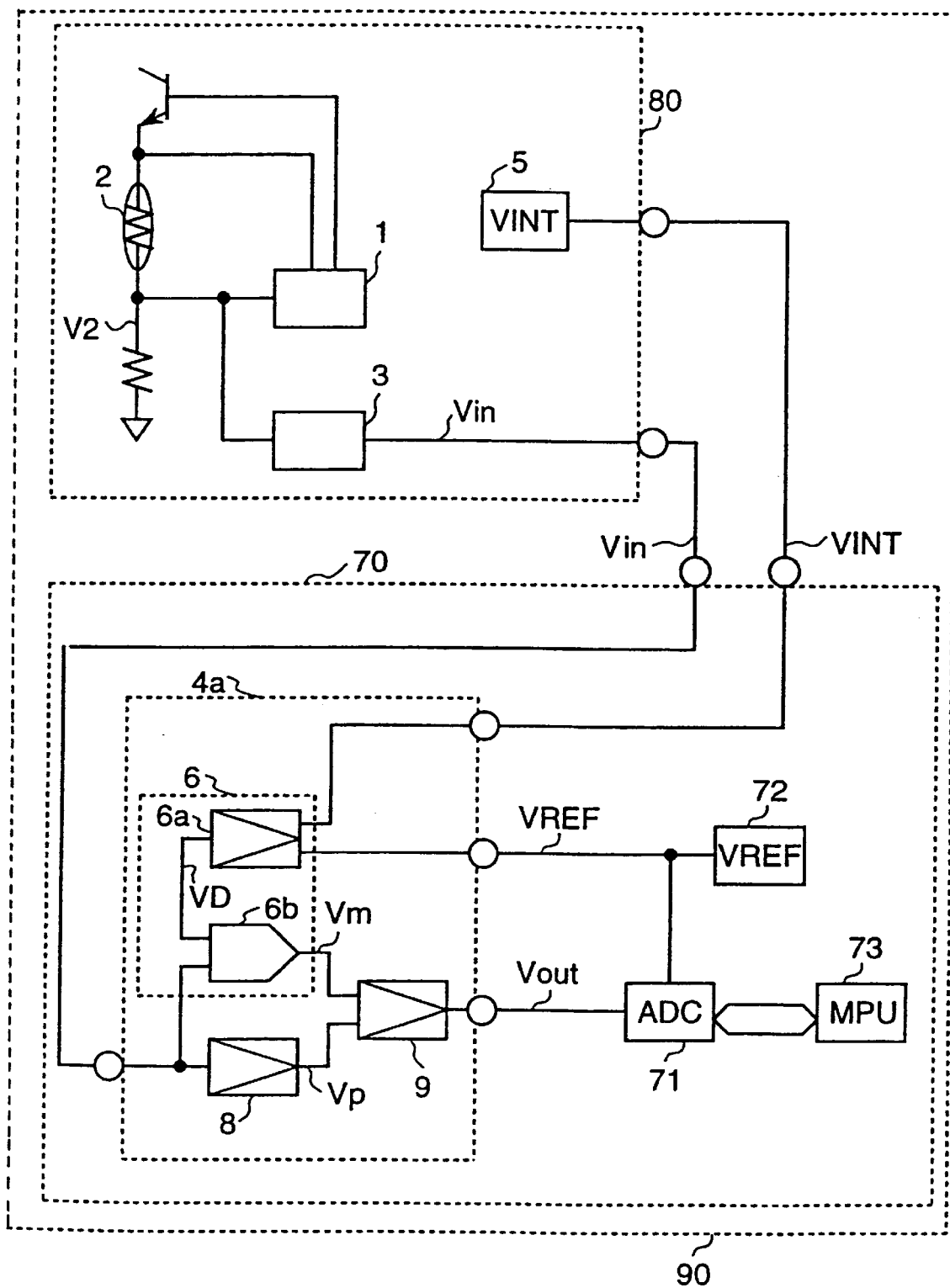
FIG. 4 is a diagram showing a third embodiment of a heating resistor type air flow-meter in accordance with the present invention.

FIG. 4 is a diagram showing a third embodiment of a heating resistor type air flow-meter in accordance with the present invention. The third embodiment of a heating resistor type air flow-meter of FIG. 4 is a part of an embodiment of an engine control apparatus. That is, this embodiment of the heating resistor type air flow-meter is shown as a part of the engine control apparatus 90 which is constructed by that, in the ratio-metric circuit 5 in the first embodiment, the internal reference electric power source circuit 5 of one component of the ratio-metric circuit 4 is left inside the air flow-meter 80 side and the other components of the ratio-metric circuit 4 except for the internal reference electric power source circuit 5 are arranged inside the ECU 70, and the internal reference voltage VREF and the air flow rate signal $V_{in}$ are transmitted from the air flow-meter 80 to the ECU 70. In other words, the components composing the ratio-metric circuit characterizing the heating resistor type air flow-meter of ratio-metric output type in accordance with the present invention are separately arranged in the other units (the ECU 70, the engine control apparatus 90 and so on).

In this embodiment, the engine control apparatus 90 is composed of the air flow-meter 80 for outputting a signal $V_{in}$ detected from current heating the heating resistor, includes the internal reference electric power source circuit 5 for generating the first reference voltage signal; and the ECU 70 including the ratio-metric circuit 4a for processing an added signal as an output signal $V_{out}$ expressing an air flow rate. In the ECU 70, there are arranged the ratio-metric circuit 4a except for the internal reference electric power source circuit 5, the AD converter 71, the reference electric power source circuit 72 for supplying the reference voltage VREF of the second reference voltage signal to the AD converter 71, and the MPU (microprocessor) 73 for processing digital signals output from the AD converter 71. By performing calculation of (Equation 9) using the ratio-metric circuit 4a in the ECU 70, even if the reference voltage VREF of the ECU 70 is fluctuated, the digital signal output from the AD converter 71 can be made insensitive to the effect of the fluctuation.

According to the embodiment of FIG. 4, there is an advantage in that the circuit construction of the ECU 80 can be made small in size. Further, in a vehicle, since environmental disturbance such as temperature, vibration, electromagnetic wave and so on is less in a place to install the ECU 70 than a place to install the air flow-meter 80, requirement of the environmental condition to the ratio-metric circuit 4a is moderated and accordingly there is an effect in that the correction system using the ratio-metric function can be made economical.

The engine control apparatus 90 using the heating resistor type air flow-meter like this embodiment can perform highly accurate engine control since measuring accuracy of air flow rate is improved. The internal reference electric power source circuit 5 may be installed in the ECU 70.

According to the present invention, since an output of the ratio-metric circuit is formed by adding an output signal of the proportional circuit and an output signal of the multiplying circuit, the ratio of the error of the multiplying circuit to the total error of the ratio-metric circuit can be reduced and accordingly the ratio-metric output characteristic of the heating resistor type air flow-meter can be made more accurate. Particularly, the present invention is effective in minimizing an output error near the median value of the external reference voltage which is most frequently used.

By employing the present invention, there is an effect in that accuracy of an engine control apparatus can be improved.

Further, by constructing the ratio-metric circuit by an analogue multiplying circuit, the heating resistor type air flow-meter of ratio-metric output type can be made low in cost.

What is claimed is:

1. A heating resistor type air flow-meter having a radio-meter circuit for outputting an output signal $V_{out}$ representing an air flow rate, by processing a voltage signal $V_{in}$ detected from a current which heats a heating resistor, using an externally generated second reference signal, wherein the ratio-meter circuit comprises:

an internal reference electric power source for generating a first reference signal;

a proportional circuit for receiving the voltage signal $V_{in}$ and outputting a signal $V_p$ proportional thereto;

a multiplying circuit for outputting a signal $V_m$ proportional to a product of (i) a difference signal between said first reference signal and said second reference signal, and (ii) said voltage signal $V_{in}$; and an adding circuit for producing said output signal $V_{out}$ by adding said signal $V_p$ and said signal $V_m$.

2. A heating resistor type air flow-meter according to claim 1, wherein a ratio ($V_p/V_m$) of the output voltage $V_p$ of said proportional circuit to the output voltage $V_m$ of said multiplying circuit is larger than 4.

3. A heating resistor type air flow-meter according to claim 1, wherein said multiplying circuit is an analogue multiplying circuit.

4. A heating resistor type air flow-meter according to claim 3, wherein:

said analogue multiplying circuit comprises a transistor LOG amplifier and a differential amplifying circuit coupled to receive an output voltage of said LOG amplifier; and said LOG amplifier is set so that an output voltage thereof becomes 0 (zero) when said second reference voltage signal has a median value within a variation range of said reference voltage signal.

5. A heating resistor type air flow-meter comprising:

a detecting circuit for outputting a signal $V_{in}$ detected from a current which heats a heating resistor provided in an air flow passage;

an air temperature detector for generating a temperature signal representing a temperature of air to be measured flowing in said air flow passage;

an adding-subtracting unit for outputting a correction signal by additively combining a voltage signal proportional to said temperature signal with a second reference voltage signal input from an external source; and a ratio-meter circuit having an internal reference electric power source for generating a first reference signal; a proportional circuit for receiving the signal $V_{in}$ and outputting a signal $V_p$ proportional thereto; a multiplying circuit for outputting a signal $V_m$ proportional to a product of (i) a difference signal between said first reference signal and said corrected signal and (ii) said signal $V_{in}$; and an adding circuit for outputting an output signal $V_{out}$ representing an air flow rate produced by adding said proportional signal $V_p$ and said multiplied signal $V_m$.

6. A ratio-meter circuit for a heating resistor type air flow meter which generates a signal $V_{in}$ representing a heating current flowing in an air flow detection resister, said ratio-meter comprising:

an internal source which provides a first reference signal;

an input for receiving an externally generated second reference signal;

a different circuit which outputs a difference signal representing a difference between the first and second reference signals;

a proportional circuit for receiving the signal $V_{in}$ and outputting a signal $V_p$ proportional thereto;

a multiplying circuit for generating a signal $V_m$ proportional to a product of said difference signal and said signal $V_{in}$; and an adding circuit for adding the signal $V_p$ and the signal $V_m$, and outputting a signal representing a sum thereof.

* * * * *